United States Patent
Pfeiffer

[15] 3,703,769
[45] Nov. 28, 1972

[54] JIG MEASURING BLOCK AND USE OF THE SAME

[72] Inventor: Richard D. Pfeiffer, 9812 S. E. 5th, Bellevue, Wash. 98004

[22] Filed: May 28, 1969

[21] Appl. No.: 828,610

[52] U.S. Cl. ............33/181 AT, 33/178 B, 29/159 R
[51] Int. Cl. .............................................G01b 3/38
[58] Field of Search...33/181 AU, 178 B, 174 G, 174 H

[56] References Cited

UNITED STATES PATENTS

| | | |
|---|---|---|
| 2,402,142 | 6/1946 | Anderer et al. ........... 33/178 B |
| 2,576,377 | 11/1951 | Wochos et al............33/178 B |

FOREIGN PATENTS OR APPLICATIONS

| | | |
|---|---|---|
| 596,103 | 12/1947 | Great Britain ...........33/178 B |
| 486,734 | 6/1938 | Great Britain ...........33/178 B |
| 1,043,762 | 11/1958 | Germany..................33/178 B |

*Primary Examiner*—William D. Martin, Jr.
*Attorney*—Thomas W. Secrest

[57] ABSTRACT

This invention is for a jig measuring block and the method of using the jig measuring block. The jig measuring block is of use in aligning gears in a differential, a transmission and final drives in small and large machinery such as small trucks, wheel-type vehicles, crawler vehicles, and industrial material handling machinery and the like. The jig measuring block makes it possible to save time, save material and to align the gears with greater accuracy in repairing such machinery. Further, it makes it possible for the small repair shops to economically and accurately repair such machinery.

22 Claims, 35 Drawing Figures

JIG MEASURING BLOCK AND USE OF THE SAME

Many pieces of equipment, having a differential, transmission or final drive, need repairing as the gears may become worn or the gears may break or the bearings may become worn and need to be replaced. An example, and one with which I am familiar as I have repaired many of these units, is the differentials on various half-ton and three-quarter-ton trucks. These half-ton and three-quarter-ton trucks use a Spicer 44 or a Spicer 45 or a Spicer 60 differential. These differentials are manufactured by the Spicer division of the Dana Corporation, Fort Wayne, Indiana and Toledo, Ohio. In the repairing and aligning of such differentials, prior to this invention, it was necessary to remove the rear axles, disconnect the universal joint leading into the differential, and take off the differential and housing from the vehicle. Then, the differential and housing were placed on a workstand. If necessary, the housing was spread, due to preloaded bearings, so as to make it possible to remove the differential assembly. The differential assembly was disassembled by removing the bearings, shims and ring gear from the ring gear mounting flange. To examine the pinion gear, bearings, and shims were removed from the housing.

Then, new bearings were pressed on to each end of the differential case, without shims and without ring gear, and the differential case and bearings were positioned in the housing so as to determine the free basic dimension. This free basic dimension was and may be taken with a dial indicator. As the differential case bearing assemblies are of the tapered roller type this free basic dimension is essentially an approximation of the non-preloaded differential test assembly.

The pinion gear was installed in the housing. The depth of the pinion gear in the housing could be determined by a pinion depth gauge. However, most repair shops did not and do not have a pinion depth gauge and therefore the depth of the pinion gear in the housing was an approximation.

The differential case assembly with the bearings on each end was removed from the housing and the ring gear was mounted on the ring gear mounting flange or the differential case mounting flange. Then, the differential case assembly with the ring gear and the bearings was installed, again, in the housing. By means of the dial indicator the position of the ring gear, with respect to the pinion gear, was approximated as to correct backlash. The ring gear was moved away from the pinion gear and the dial indicator reading of this movement was taken to give the thickness of shims to be positioned on the gear side of the differential case, i.e., the gear side of the differential case being that side of the case on which was mounted the ring gear. This was a non-preloaded dimension. The thickness of shims on the gear side of the differential case was subtracted from the free basic dimension shim pack to give the thickness of shims on the off-gear side of the differential case, i.e., that side of the differential case away from the differential case mounting flange of the ring gear.

The bearings, which were and are a pressed fit on the differential case, were removed by a bearing puller. The necessary thickness of shims, in the inboard shim method, were installed on the differential case plus 0.008 to 0.010 inches of shims on each side of the differential case. This provides specified preload. Then, the bearings are again pressed onto the hubs of the differential case.

At this stage the housing was spread by means of a special tool, and the differential case assembly was once again positioned in the housing. The housing was spread to accommodate the preloaded condition of the differential case assembly with the bearings and shims on the differential case assembly. With the bearings and shims on the differential case assembly, the differential case assembly was wider than the opening leading into the housing and it was necessary to spread the housing. In the spreading of the housing a dial indicator was mounted in such a manner so as to indicate the spread. The maximum allowable spread is 0.020 inches. If the spread is greater than 0.020 inches the housing may be permanently distorted. After the differential case assembly was installed in the housing the spreader tool was relaxed or removed and bearing caps installed.

At this stage the run out of the ring gear was checked with a dial indicator. If the run out was in excess of 0.002 inches, maximum, it was necessary to remove the differential case assembly from the housing. And, the ring gear was removed from the differential case assembly. Then, the differential case assembly was installed in the housing and the ring gear mounting flange of the differential case was checked with a dial indicator to determine if the differential case was worn or defective. If a new differential case had to be installed, then the free basic dimension again had to be determined because of manufacturing tolerances and the variation in dimensions from one differential case to another differential case.

The reader is reminded that every time the differential case assembly is installed in and removed from the housing that the housing must be spread.

At this stage the backlash between the pinion gear and the ring gear was checked to see if there was the specified amount of backlash.

If the backlash between the ring gear and the pinion gear was incorrect then the differential case assembly was removed from the housing. The pressed-on bearings were removed with a puller. In removing the pressed on bearings with the puller the shims were damaged and it was necessary to replace the shims. In one repair installation I had to use 120 new shims of various thicknesses. New shims were positioned on the differential case assembly and the bearings were again pressed onto the differential case assembly. The differential case assembly with shims and pressed on bearings was again positioned in the housing and the backlash between the ring gear and the pinion gear determined. This procedure was repeated until the correct and specified backlash was obtained between the ring gear and the pinion gear. Many times, it was necessary to repeat the steps of removing the differential case assembly, taking off the bearings with the puller and installing new shims and again pressing on the bearings.

When the correct backlash between the ring gear and pinion gear was obtained then the correct depth of the pinion gear was determined. To do this the ring gear teeth were and are painted with a white lead or a red lead and the ring gear and pinion gear were and are rotated to determine the tooth contact pattern between the ring gear and the pinion gear. If the pattern was incorrect, then the pinion gear, shims, and bearings were removed from the housing. However, before the pinion gear could be removed from the housing it was necessary to remove the differential case assembly comprising the ring gear, shims and bearings from the housing. Then, the pinion gear assembly was removed and the necessary corrections made with respect to the thickness of shims in the inner pinion gear bearing bore.

The pinion gear assembly was installed, once again in the housing. At this stage, it must be remembered, that the backlash between the ring gear and the pinion gear had been changed because the thickness of shims on the pinion gear assembly had been changed and the depth of the pinion gear in the housing had been changed. Therefore, it was necessary, once again to determine the correct and specified backlash between the ring gear and the pinion gear.

Briefly, any change in pinion depth to correct gear tooth contact pattern resulted in a change in the ring gear and the pinion gear backlash. In order to return the ring gear and the pinion gear to the specified backlash it was again necessary to remove the bearings from the differential case assembly comprising the ring gear, shims, and bearings. In so removing the bearings a number of shims were again destroyed. Further, the bearings again had to be pressed onto the differential case. Then, it was necessary again to determine the gear tooth contact pattern between the ring gear and the pinion gear. If the gear tooth contact pattern was not satisfactory, the entire procedure had to be repeated until a satisfactory gear tooth contact pattern was secured. Sometimes, the differential case assembly bearings had to be removed and replaced 5 or 6 times and, it is to be remembered, that each time the differential case assembly bearings were removed and replaced it was necessary to use new shims as the shims on the differential case assembly were damaged or deformed by pulling the bearing off the differential case assembly. This was not all. Unfortunately, every once in a while, a bearing was damaged in removing the bearing from the differential case assembly. It will be found, due to manufacturing tolerances, that the thickness of the new bearing may be different than the thickness of the damaged bearing. With this difference in thickness there was necessitated a difference in the thickness of shims. This meant that the procedure had to be, virtually, started from the beginning and the entire procedure repeated until the proper backlash and gear tooth contact pattern was secured between the ring gear and the pinion gear.

From the foregoing it is seen that the repairing of a differential of this type was an approximation until the correct gear tooth contact pattern was secured between the ring gear and the pinion gear. One of the contributing factors to this approximation is the fact that with this procedure it is not possible to secure a correct determination of the preload of the differential case assembly. With this method the preload condition is, usually, an approximation.

With this procedure it is not possible to repair the differential while the differential is attached to the vehicle. The repair manual allows 7.7 hours to overhaul the differential according to this procedure. Of this time 2.5 hours are allowed for removing and replacing the differential or rear end from the vehicle. Further, of this 7.7 hours there are allowed 5.2 hours for overhauling the differential or rear end. Sometimes, it is possible to overhaul the differential in 5.2 hours and sometimes due to difficulties in approximating the correct gear tooth contact pattern between the ring gear and the pinion gear and difficulties in pulling the bearings from the differential case assembly there is required as long as eight hours for overhauling the differential. Actually, when a party starts to overhaul the differential it is not known if the differential can be overhauled in the specified 5.2 hours of if a greater period of time will be required.

Because of the uncertainty of the method of measuring there is the possibility, when overhaul is completed, that there may be an excessive or insufficient preload on the differential case assembly bearings. This excessive or insufficient preload will result in premature failure of these bearings.

As contrasted with the preceding procedure there is briefly outlined the procedure for repairing a differential using my jig measuring blocks and which procedure makes possible to more satisfactorily preload the differential.

The housing is spread, either in the vehicle or removed from the vehicle, and the differential case assembly removed, and, also, the pinion gear assembly removed. The pinion gear assembly is disassembled and the differential case assembly is disassembled. All parts are cleaned and examined. The condition of the gears is determined. Then, after determining the pinion gear depth the pinion gear assembly is reinstalled. The differential case assembly, without the ring gear mounted on the ring gear mounting flange, and with jig measuring blocks on the differential case assembly, remember, there are no bearing assemblies on the differential case assembly at this stage, the differential case assembly is installed in the differential housing to determine the thickness of shims required. By way of re-capitulation, after the differential case assembly has been removed from the housing, the spreader tension is relieved so as to allow the housing to be relaxed to resume its normal shape. Now, the differential case assembly, without the ring gear and with the jig measuring blocks installed can be inserted into the housing without spreading the housing. The reason for this is that there are no shims on the differential case assembly at this stage. After the thickness of shims, required for the differential case assembly, has been determined then the differential case assembly is removed from the housing, the ring gear installed, and the differential case assembly with the ring gear is reinstalled into the housing. The backlash is determined and the gear tooth contact pattern between the ring gear and the pinion gear is obtained. The differential case assembly with the ring gear is removed from the housing, and the bearings and shims plus the thickness of shims required for pre-load condition, are installed on the differential case assembly. The housing is spread and the differential case assembly is installed in the housing. The bearing caps can be installed and the housing sealed. This, is the general procedure with the use of my subject invention, i.e., the jig measuring block.

From having overhauled differentials and other pieces of machinery having gears it is an object of this invention to provide the jig measuring block where less labor is required for setting up gears than previously available; to provide a method using less labor than previous methods have provided, to provide a jig measuring block requiring less time to align gears than with previously available equipment; to provide a method requiring less time to align gears than prior methods; to provide a jig measuring block whereby greater accuracy is realized in measurements for aligning gears; to provide a jig measuring block making it less expensive to overhaul differentials and gear type machinery; to provide a jig measuring block whereby there is no damage to shims and bearings in overhauling a differential and gear type machinery; to provide a method whereby there is no damage to shims and bearings in overhauling a differential and gear type machinery as contrasted with prior methods wherein there was damage; to provide a method and apparatus for more satisfactorily preloading the differential; to provide a jig measuring block and a method which makes it possible to have a preview of the entire overhaul of the differential before bearings and shims are placed on the differential case assembly; and, to provide a jig measuring block which makes it possible to have better gear tooth contact between the gears in a differential and in gear type machinery.

These and other important objects and advantages of the invention will be more particularly brought forth upon reference to the accompanying drawings, the detailed description of the invention and the appended claims.

Figure 1:
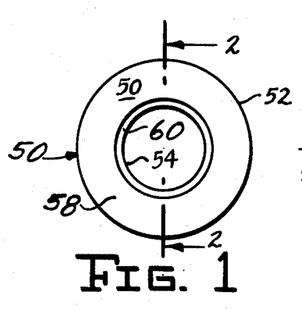
FIG. 1 is a side elevational view of one form of the jig measuring block.

In FIG. 1 there is illustrated a jig measuring block 50 of a general annular configuration. The jig measuring block 50 has an outside surface 52 of a diametrical dimension which is substantially the same as, but slightly less than, the interior diametrical dimension of a bearing assembly bore and in which bore said jig measuring block 50 will be positioned. Further, said jig measuring block has a center line 51 and which center line is a center line of said outside diametrical dimension. This center line will substantially coincide with the center line of said bearing assembly bore when said block is positioned in said bearing assembly bore. The block has a central bore 54. The center line of the jig measuring block is also the center line of the central bore. The interior diametrical dimension of the central bore is slightly larger than the exterior diametrical dimension of a first bearing surface on which the block will be positioned. This provides a rotatable clearance between the jig measuring block and the first bearing surface. The jig measuring block 50 has two flat sides 56 and 58 and is of a width substantially equal to the width of a bearing assembly for which said bearing assembly said block will be temporarily substituted in said bearing bore and on said bearing surface.

Figure 2:
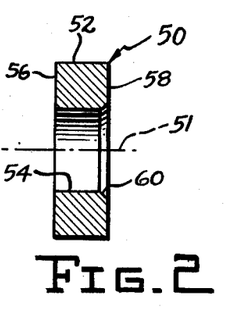
FIG. 2 is a cross-sectional view of the jig measuring block and illustrates the bore as being chamfered at one side.

In FIG. 2 it is seen that the central bore on one side is chamfered at 60.

Figure 3:
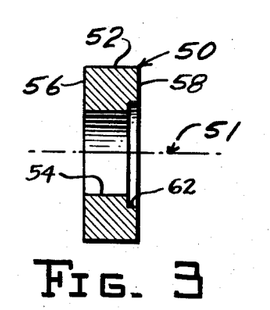
FIG. 3 is a cross-sectional view of the jig measuring block and illustrates the bore as having a stepped recess at one side.

In FIG. 3 it is seen that the central bore 54 on one side has a stepped recess 62.

Figure 4:
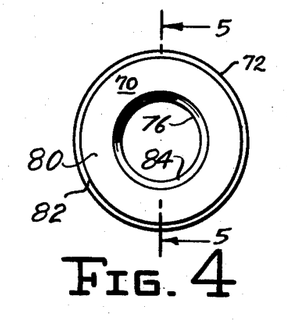
FIG. 4 is a side elevational view of another embodiment off the jig measuring block.
Figure 5:
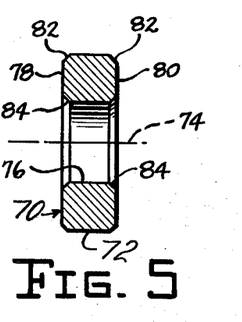
FIG. 5 is a cross-sectional view of the jig measuring block and illustrates the edges as being chamfered and the bore as being chamfered at both sides.
Figure 6:
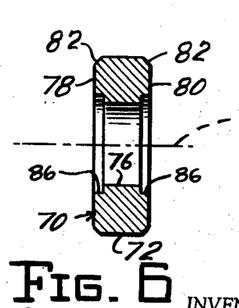
FIG. 6 is a cross-sectional view of a jig measuring block and illustrates the edges as being chamfered and the bore as having a stepped recess at each side.

In FIGS. 4, 5 and 6 there are illustrated embodiments of a jig measuring block 70 and which jig measuring block is of a generally annular configuration having an outside diametrical surface 72. The outside diametrical dimension of this jig measuring block is substantially the same as but slightly less than the interior diametrical dimension of a bearing assembly bore and in which bore said jig measuring block will be positioned. This jig measuring block has a center line 74 and which center line is a center line of the outside diametrical dimension of the jig measuring block. Also, this center line substantially coincides with the center line of said bearing assembly bore when said block is positioned in the bore. The jig measuring block 70 has a central bore 76. The center line of the jig measuring block substantially coincides with the center line of the central bore 76. The central bore 76 has an interior diametrical dimension substantially the same as, but slightly larger than, the exterior diametrical dimension of a first bearing surface on which the jig measuring block will be positioned. This provides a rotatable clearance between said jig measuring block and said first bearing surface. In FIGS. 5 and 6 it is seen that the jig measuring block 70 has two substantially parallel flat sides 78 and 80. At the junction of the side 78 with the outside surface 72 and at the junction of the side 80 with the outside surface 72 there are chamfers 82. The jig measuring block 70 has a width approximately equal to the width of a bearing assembly and for which said bearing assembly said jig measuring block will be temporarily substituted in said bearing assembly bore and on said bearing surface.

In FIG. 5 it is seen that at each side of the bearing bore 76 there is a chamfer 84.

In FIG. 6 it is seen that at each side of the bearing bore 76 there is a stepped recess 86.

Figure 7:
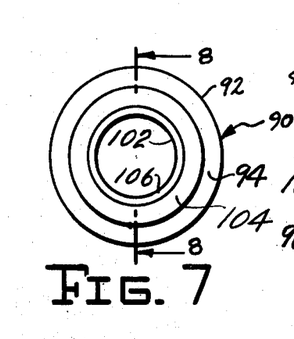
FIG. 7 is a side elevational view of another embodiment of a jig measuring block.
Figure 8:
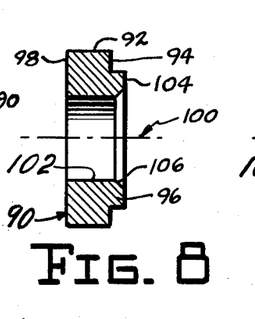
FIG. 8 is a cross-sectional view of the jig measuring block and illustrates a shoulder, and the bore as being chamfered at one side.
Figure 9:
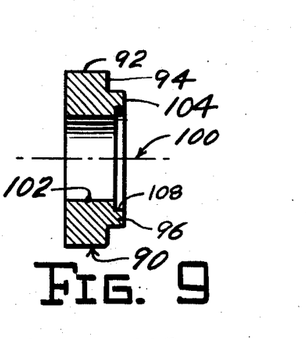
FIG. 9 is a cross-sectional view of the jig measuring block and illustrates a shoulder, and the bore as having a stepped recess at one side.

In FIG. 7, 8 and 9 there is illustrated a jig measuring block 90 of a generally annular configuration having an outside surface 92. Further, the jig measuring block 90 has a side 94 and on the side 94 there is a shoulder 96. The jig measuring block 90 also has a flat side 98. The jig measuring block 90 is of a generally annular configuration whose outside diametrical dimension, as determined by the surface 92, is substantially the same as but slightly less than the interior diametrical dimension of a bearing assembly bore and in which bore said jig measuring block 90 will be positioned. The jig measuring block 90 has a center line 100. The center line 100 substantially coincides with the center line of the outside diametrical dimension as determined by the surface 92. The center line will also substantially coincide with the center line of a bearing assembly bore when said jig measuring block is positioned in said bore. The jig measuring block 90 has a central bore 102 and which central bore 102 is also the central bore of the shoulder 96. The center line 100 also substantially coincides with the center line of the central bore 102. The central bore 102 has an interior diametrical dimension substantially the same as but slightly larger than the exterior diametrical dimension of a first bearing surface and on which first bearing surface the jig measuring block will be positioned so as to provide a rotatable clearance between said jig measuring block and said first bearing surface. The jig measuring block 90 has a width, including the shoulder 96, approximately equal to the width of a bearing assembly and for which said bearing assembly said jig measuring block will be temporarily substituted in said bearing assembly bore and on said bearing surface. Also, the shoulder 96 has a side 104.

In FIG. 8 it is seen that the central bore 102 at one side is chamfered at 106.

In FIG. 9 it is seen that the central bore 102 at one side has a stepped recess 108.

Figure 10:
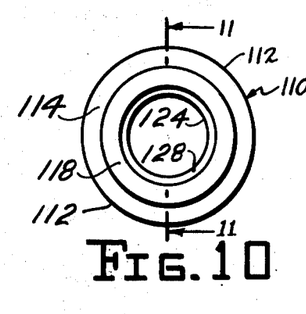
FIG. 10 is a side elevational view of another embodiment of the jig measuring block.

In FIG. 10 there is illustrated a jig measuring block 110 having an outside diametrical dimension as determined by the outside surface 112. Said outside diametrical dimension is substantially the same as but slightly less than the interior diametrical dimension of the bearing assembly bore and in which bore said block will be positioned. The jig measuring block 110 has a side 114 and on the side 114, a shoulder 116. The shoulder 116 has a side 118. Further, the jig measuring block 110 has a side 120. The jig measuring block 110 has a center line 122. The center line 122 substantially coincides with the center line of the outside surface 112. The center line 122 will substantially coincide with the center line of a bearing assembly bore when said jig measuring block is positioned in said bore. The jig measuring block 110 has a central bore 124. The center line of the jig measuring block 110 and the center line of the central bore 124 substantially coincide. The central bore 124 has an interior diametrical dimension substantially the same as but slightly larger than the exterior diametrical dimension of the first bearing surface on which the block will be positioned. This provides a rotatable clearance between the jig measuring block and said first bearing surface. The jig measuring block 110 has a width approximately equal to the width of a bearing assembly and for which said bearing assembly said jig measuring block will be temporarily substituted in said bearing assembly bore and on said bearing surface. At the junction of the side 120 and the surface 112 and at the junction of the side 114 and the surface 112 there are chamfers 126.

Figure 11:
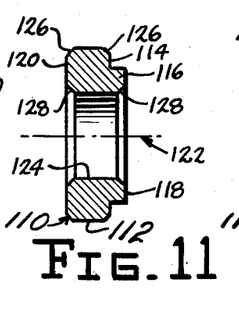
FIG. 11 is a cross-sectional view of the jig measuring block having a shoulder, and illustrates the edges as being chamfered and the bore as being chamfered at both sides.

In FIG. 11 it is seen that the central bore 124 at the sides is chamfered at 128.

Figure 12:
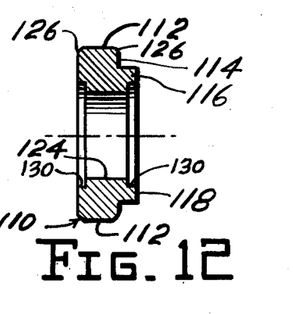
FIG. 12 is a cross-sectional view of the jig measuring block having a shoulder, and illustrates the edges as being chamfered and having a bore with a stepped recess at each side.

In FIG. 12 it is seen that the central bore 124 at the sides terminates in a stepped recess 130.

Figure 13:
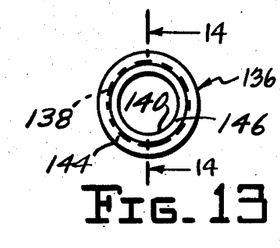
FIG. 13 is a side elevational view of an adapter sleeve for use with the jig measuring block.
Figure 14:
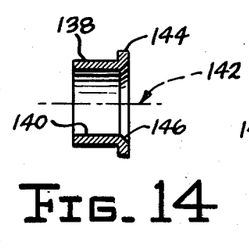
FIG. 14 is a cross-sectional view of the adapter sleeve and illustrates the bore of the adapter sleeve as being chamfered on the shoulder side.
Figure 15:
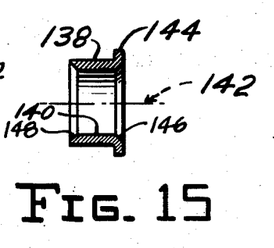
FIG. 15 is a cross-sectional view of the adapter sleeve and illustrates the bore of the adapter sleeve as being chamfered at both sides.

In FIGS. 13, 14 and 15 there is illustrated an adapter sleeve 136. This adapter sleeve is of a generally annular configuration whose exterior diametrical dimension 138 is slightly less than the interior diametrical dimension of a central bore of a jig measuring block in which said adapter sleeve 136 is to be positioned. The adapter sleeve has a central bore whose interior diametrical dimension 140 is substantially the same as but slightly larger than the exterior diametrical dimension of a second bearing surface on which said jig measuring block and said adapter sleeve 136 is to be positioned. With the adapter sleeve in the central bore of the jig measuring block the center line of the adapter sleeve substantially coincides with the center line of the jig measuring block. The adapter sleeve has an exterior diametrical dimension slightly less than the interior diametrical dimension of the central bore of the jig measuring block. This makes it possible to position the adapter sleeve in the central bore of the jig measuring block so as to provide a rotatable clearance between the jig measuring block and the adapter sleeve. The adapter sleeve has a central bore whose interior diametrical dimension is substantially the same as but slightly larger than the exterior diametrical dimension of a second bearing surface on which the jig measuring block and the adapter sleeve will be positioned. This provides a rotatable clearance between said adapter sleeve and said second bearing surface. The adapter sleeve has a center line 142 and which center line is also the center line of the adapter sleeve central bore. Further, the adapter sleeve has a circular shoulder 144 at one end. The central bore 140 of the adapter sleeve is chamfered at 146 at one side and at that side where there is the circular shoulder 144.

In FIG. 15 the adapter sleeve has a chamfer 146 at one side and a chamfer 148 at the other side of the central bore.

Figure 16:
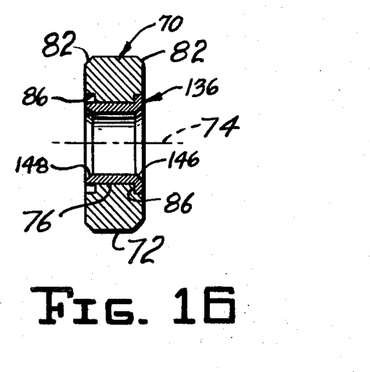
FIG. 16 is a cross-sectional view of a combination of the jig measuring block of FIG. 6 and the adapter sleeve of of FIG. 15 and with the adapter sleeve in the bore of the jig measuring block.

In FIG. 16 there is illustrated a jig measuring block 70 having stepped recesses 86 at both sides of the central bore 76. Further, there is positioned in the central bore 76 the adapter sleeve 136 having chamfers 146 and 148. The combination of the jig measuring block and the adapter sleeve in FIG. 16 illustrates the manner in which the adapter sleeve is positioned in the jig measuring block 70 so that the jig measuring block 70, or similar jig measuring blocks, can be adapted for use on the bearing surfaces of a smaller diameter.

In FIGS. 17, 18, 19, 20, 21, 22, 26, 27, 28 and 29 there are illustrations of the use of the jig measuring block in the inboard shim method of adjustment.

Figure 17:
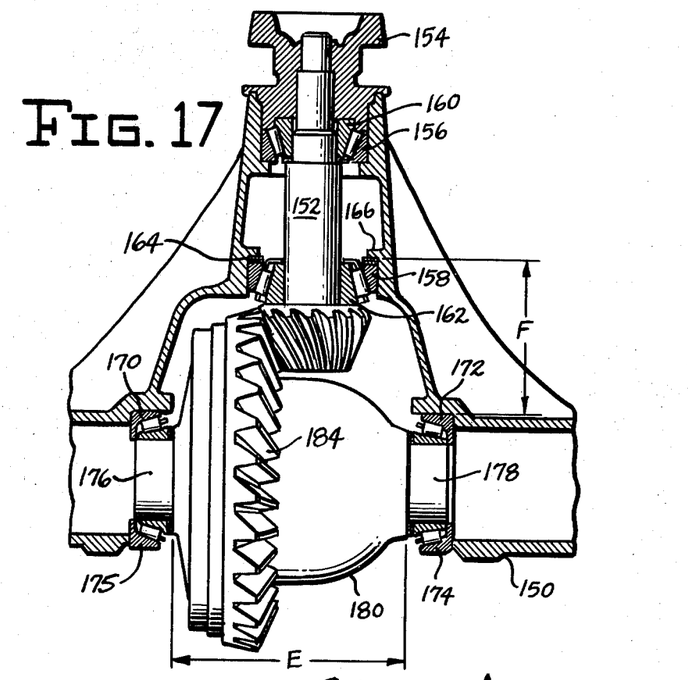
FIG. 17 is a fragmentary, partial cross-sectional view of a differential and illustrates the pinion gear assembly, the differential case assembly and the inboard shims in the differential case assembly, in the differential housing.

In FIG. 17 there is a fragmentary cross-sectional view of a differential 150 having an integral pinion gear and shaft 152. On the outer end of the pinion gear shaft 152 there is a pinion gear yoke 154.

In the housing 150 there are spaced apart bearing bores 156 and 158 for receiving an outer bearing 160 for the pinion gear 152 and an inner bearing 162 for the pinion gear 152. In FIG. 17 it is seen that there are shims 164 between a circular shoulder 166 and the bearing 158 so as to position the bearing 162 and the pinion gear 152 in the bearing bore 158. The function of the shims 164 will be more particularly described in a later part of the specification.

Also, in the housing 150 it is seen that there are two spaced apart differential case bearing bores 170 and 172. The bearing bore 170 is on the gear side of the differential case and the bearing bore 172 is on the off-gear side of the differential case. In the bearing bore 170 there is a bearing 175 and in the bearing bore 172 there is a bearing 174. The bearings 174 and 175 are pressed onto the hubs 176 and 178 of the differential case 180. The hub 176 is on the gear side of the differential case and the hub 178 is on the off-gear side of the differential case. The differential case has a ring gear mounting flange 182. On the ring gear mounting flange 182 there is mounted a ring gear 184 and which ring gear is secured by bolts to the ring gear mounting flange.

Figure 21:
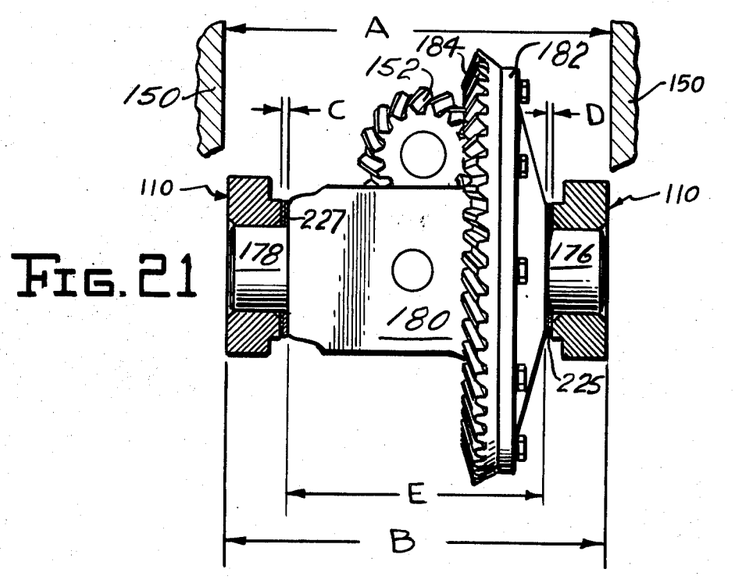
FIG. 21 is a fragmentary, partially cross-sectional view of the differential case test assembly, different embodiments of the jig measuring blocks and illustrating some of the basic dimensions of the differential case test assembly and the differential housing.

In FIG. 21 there is a fragmentary illustration, partially in cross-section, of the differential case test assembly with the jig measuring blocks 110 on the hubs 176 and 178 and a fragmentary portion of the differential housing 150.

In FIG. 21 A represents the normal opening in the differential housing 150. This opening is a variable dimension due to manufacturing tolerances. Normally, in assembling a differential case assembly with inboard shims the dimensions of the differential case assembly are larger than the dimensions of the opening A. Therefore, a spreader tool 151 is required to enlarge the opening A by approximately 0.020 inches. It is advisable to not spread the opening A by more than 0.020 inches in order to avoid permanent distortion of the differential housing 150.

The dimension B is the overall length of the differential case test assembly with inboard shims and the jig measuring blocks positioned on the hubs. The dimension B is approximately equal to but slightly less than the dimension A so as to provide rotatable clearance between the differential case test assembly and the jig measuring blocks.

The dimensions C and D are variable in order to place the ring gear in its proper position relative to the pinion gear 152 to obtain specified backlash between the ring gear and the pinion gear. Also, the dimensions C and D are variable in order to properly preload the bearing assemblies on the differential case assembly. The dimension C is the off-gear side dimension between the jig measuring block and the differential case. The dimension D is the gear side dimension between the jig measuring block and the differential case.

The dimension E is the overall length of the differential case, less hubs, and is a variable due to manufacturer's tolerances.

Because of the variation in the manufacturers' tolerances of the dimension A, the dimension B, the dimension E and variation in the thickness of the bearing assemblies 174 and 175, it is necessary to use shims of various thicknesses in order to obtain specified backlash between the ring gear and the pinion gear and also to obtain necessary preload of the differential case assembly.

In FIG. 17 there is illustrated the dimension F. The dimension F is the shortest distance between the bearing bore 170 or 172 and the inner surface of the cylindrical wall 166 of the pinion gear bearing bore 158. The dimension F is an accurate dimension and does not vary more than 0.0005 inches. In other words, the maximum variation in the dimension F from one differential housing 150 to another differential housing 150 is 0.001 inches.

In the pinion gear 152 there is a variation in the depth of the gear teeth due to the manufacturer's tolerance. The variation will run from ±0.006 inches. This is marked on the pinion gear 152 so that the party assembling the differential will have a reference dimension. Then, the proper thickness of shims 164 can be used to approximately correct for the variation in the manufacture of the pinion gear 152. The dimension marked on the pinion gear 152 indicates whether the pinion gear will extend farther into the housing or not as far into the housing. The shims 164 are necessary to make corrections for this dimension to have the pinion gear 152 positioned properly in the differential housing 150.

Figure 23:
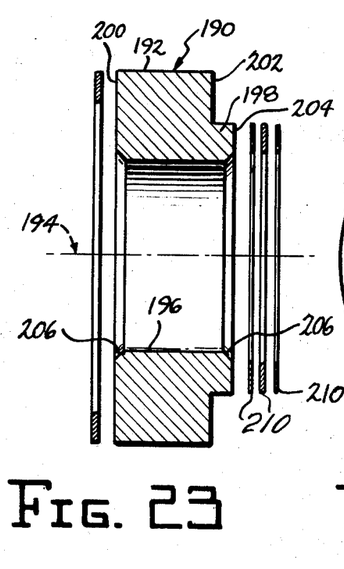
FIG. 23 is a cross-sectional view of a specific embodiment of the jig measuring block and associated shims.

In FIG. 23 there is illustrated a jig measuring block 190 of a generally annular configuration. The jig measuring block 190 has an outside surface 192 of a diametrical dimension which is substantially the same as, but slightly less than, the interior diametrical dimension of a bearing assembly bore and in which bore said jig measuring block will be positioned. Further, said jig me0suring block has a center line 194 and which center line is a center line of said outside diametrical dimension. The center line will substantially coincide with the center line of said bearing assembly bore when said block is positioned in said bearing assembly bore. The jig measuring block has a central bore 196. The center line of the jig measuring block is also substantially the center line of the central bore 196. The interior diametrical dimension of the central bore is slightly larger than the exterior diametrical dimension of a first bearing surface on which the jig measuring block will be positioned. This provides a rotatable clearance between the jig measuring block and the first bearing surface. The jig measuring block 190 has a width, including the circular shoulder 198, approximately equal to the width of a bearing assembly and for which said bearing assembly said block will be temporarily substituted in said bearing assembly bore and on said bearing surface. The jig measuring block 1810 has side 200 and a side 202. The circular shoulder 198 is on the side 202. The circular shoulder 198 has a side 204. The central bore 196, on each end is chamfered at 206.

Figure 24:
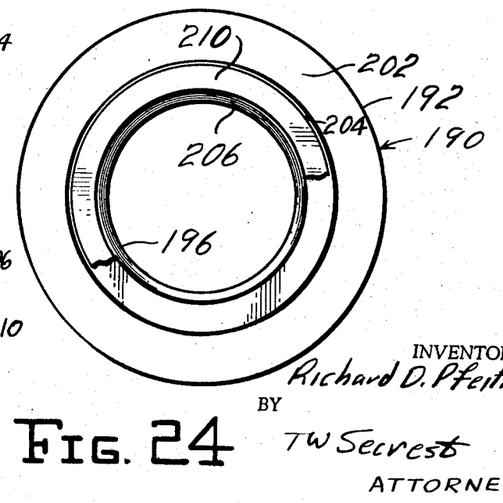
FIG. 24 is a side elevational view of the jig measuring block and the associated shims on the side of the shoulder of the jig measuring block.

There is associated with the jig measuring block 190 a large diameter outboard shim 208 and small diameter inboard shims 210. The shim 208 is used in the outboard shim method of adjustment. The shims 208 are available in various thicknesses. Therefore, generally speaking, only one shim thickness 208 is used in association with the jig measuring block 190. The thickness of the large diameter outboard shims 208 vary from 0.060 inches to 0.095 inches in increments of 0.001 inches. The shims 210 are used in the inboard shim method of adjustment. There is used, generally, a multiplicity of shims 210. The shims 210 come in thicknesses of 0.003 inches, 0.005 inches, 0.010 inches and 0.030 inches.

Figure 26:
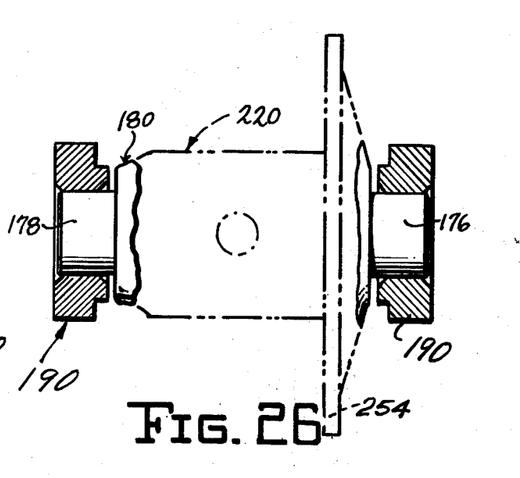
FIG. 26 is a view, partially in phantom and partially in cross-section, of a differential case test assembly, without ring gear and with jig measuring blocks on the differential case test assembly.
Figure 27:
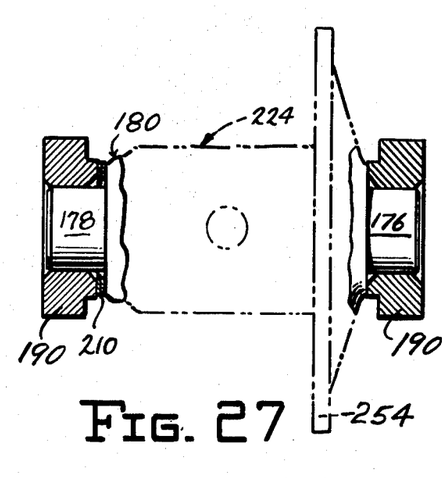
FIG. 27 is a view, partially in phantom and partially in cross-section, of a differential case test assembly, without ring gear, and with jig measuring blocks on the differential case test assembly and with inboard shims on both the gear side and the off-gear side of the differential case test assembly.
Figure 28:
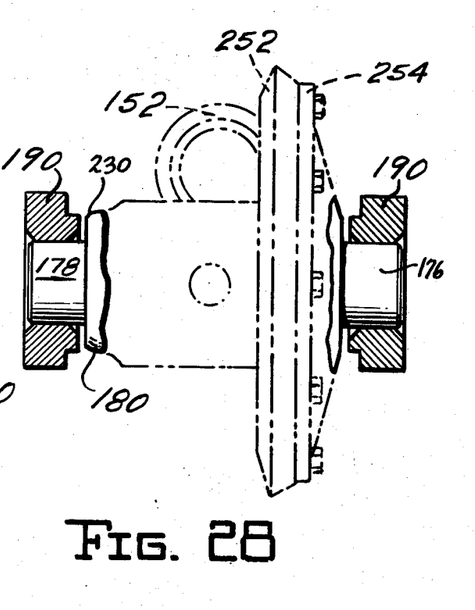
FIG. 28 is a view, partially in phantom and partially in cross section, of a differential case test assembly with the ring gear mounted on the ring gear mounting flange.
Figure 29:
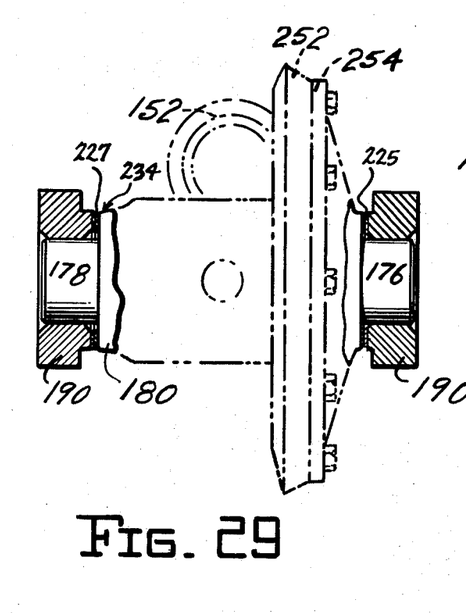
FIG. 29 is a view, partially in phantom and partially in cross section, of a differential case test assembly with the ring gear mounted on the ring gear mounting flange and with the jig measuring blocks on the differential case test assembly and with inboard shims on the gear side and the off-gear side of the differential case test assembly.

In FIG. 26 there is illustrated a differential case test assembly 220 comprising the differential case 180, without the ring gear, and with the jig measuring block 190 positioned on the hubs 176 and 178. At this time there are no shims on the differential case test assembly 220. The differential case test assembly 220 is positioned in said differential case bearing bores 170 and 172 in the differential housing 150. The jig measuring blocks 190 are substituted for the differential case bearing assemblies 174 and 175. Said jig measuring blocks are in said differential case bearing bores 170 and 172 with a first jig measuring block being firmly bottomed in an adjacent first differential case bearing bore so as to leave the free basic dimension between the second jig measuring block and the adjacent second differential case bearing bore. Then, there is determined said free basic dimension between said jig measuring block and said second differential case bearing bore so as to determine the basic shim dimension necessary for a non-preloaded differential case test assembly.

After the step of determining the basic shim dimension for a non-preloaded differential case test assembly then shims are positioned on the differential case test assembly. This is accomplished as follows. The differential case test assembly 220 is removed from the housing. Then, the jig measuring block 190 on the off-gear side of the differential case 180 is removed and inboard shims 210 are positioned on the hub 178 and the jig measuring block 190 is placed on the hub 178 to form a differential case test assembly 224. In this regard see FIG. 27. The thickness of the shims 210 was determined in the previously described step. With the shims 210 positioned on the differential case test assembly 224 there is formed a non-preloaded differential case test assembly with said shims and said jig measuring blocks. Then, the differential case test assembly 224 is positioned in said differential case bearing bores 170 and 172 in the differential housing 150. By positioning said shims 210 on the off-gear side of the differential case test assembly 224 it is possible to obtain the correct rotatable clearance between the jig measuring blocks 190 and said differential case 180. The off-gear side of said differential case test assembly 224 is that side of the differential case test assembly away from the differential case mounting flange 182 for the ring gear.

After the preceding step the differential case test assembly 224 is removed from the housing and the ring gear 184 is installed on the ring gear mounting flange 182 to form differential case test assembly 230. The differential case test assembly does not have any shims and there is a clearance on both sides of the differential case 180. In this regard see FIG. 28. Then, the differential case test assembly 230 is installed in the bearing bores 170 and 172 of the differential housing 150. Then, the ring gear is positioned, with the assistance of a dial indicator, to have specified backlash with the pinion gear 152. Then, with the aid of a dial indicator, there is determined the thickness of inboard shims to be positioned on the hub 176 or the gear side of the differential case test assembly 230.

After the preceding step the differential case test assembly 230 is removed from the housing, and both jig measuring blocks 190 are removed from the hubs 176 and 178. With respect to FIG. 27 and the steps described for FIG. 27 there was determined the thickness of shims 210. This thickness of shims 210 is identified as the basic shim pack. From the preceding step there was determined the thickness of shims required for the gear side of the differential case test assembly. The thickness of shims required for the gear side is taken from the basic shims pack 210 and positioned on the hub 176, and is identified by reference numeral 225. The remainder of the shims 227, from the basic shims pack 210, are positioned on the hub 178. Then, the jig measuring blocks 190 are positioned on the hubs 176 and 178 to form differential case test assembly 234. In this regard see FIG. 29.

Then, the differential case test assembly 234 is installed in the differential case bearing bores 170 and 172 and in the differential housing 150. In this regard see FIG. 22. The backlash between the ring gear and the pinion gear is checked to determine if there is specified backlash between these two gears. If the backlash is incorrect then shims must be shifted from side to side to secure the specified backlash. After the specified backlash is secured then the gear tooth contact between the pinion gear and the ring gear is checked to determine the correct depth of the pinion gear in the housing and with respect to the ring gear. If necessary, the depth of the pinion gear in the housing is adjusted to have the correct gear tooth contact pattern between the pinion gear and the ring gear. The gear tooth contact pattern between the ring gear and the pinion gear is visually determined by painting red lead or white lead or some other suitable visual indicator on the ring gear teeth and rotating the ring gear so as to have the ring gear teeth contact the teeth of the pinion gear.

Figure 22:
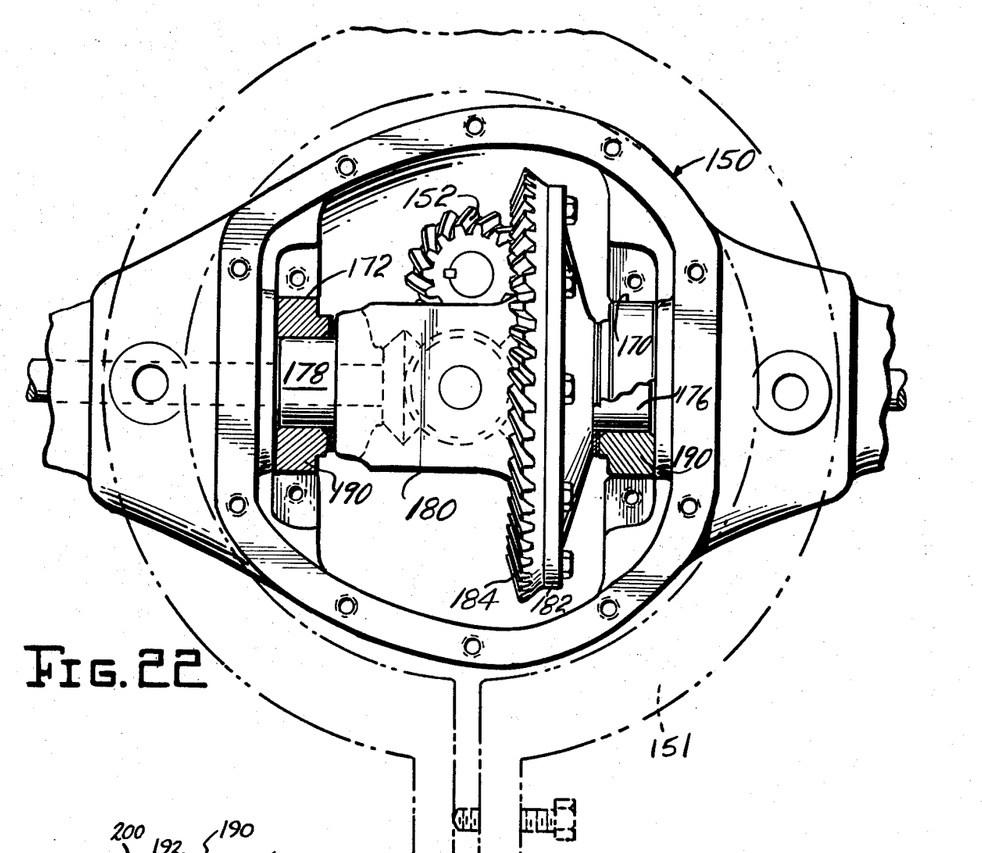
FIG. 22 is a view of the differential housing and looking into the interior of the housing and illustrates the pinion gear, the differential case test assembly in jig measuring blocks in the differential housing, and illustrates, in phantom, a spreader tool for spreading the differential housing so as to make the opening into the differential housing larger in order to accommodate a preloaded differential case assembly.

If it is necessary to adjust the depth of the pinion gear 152 in the housing 150 to obtain an acceptable gear tooth contact pattern then it is necessary to rearrange the shims on the hubs 176 and 178 in order to return to the specified backlash between the ring gear and the pinion gear.

Then, the differential case test assembly 234 is removed from the differential housing 150. The jig measuring blocks are removed from the differential case test assembly 234. The thickness of each jig measuring block 190 is known. The thickness of a bearing assembly with respect to the thickness of the jig measuring block on the off-gear side is determined. This makes it possible to add or subtract to the thickness of the shims on the off-gear side of the differential case assembly. Likewise, the thickness of the jig measuring block on the gear side of the differential case test assembly 234 is known. The thickness of a bearing assembly, with respect to the jig measuring block, for the gear side of the differential case assembly is determined. This makes it possible to know if the thickness of shims on the gear side of the differential case assembly should be increased or decreased. Then, the differential case assembly is pre-loaded. The preload can vary from 0.008 inches to 0.010 inches of shims on each hub 176 and 178 of the differential case 180, but must be in equal thickness on both sides. Then, the appropriate bearing assembly is pressed onto the hubs 176 or 178 to form the preloaded differential case assembly.

Figure 34:
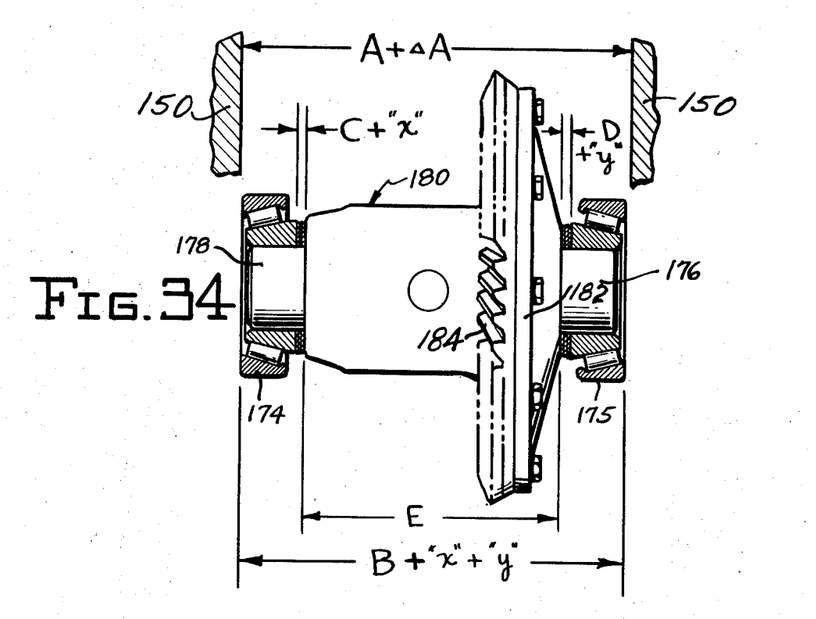
FIG. 34 is a view, partially in phantom and partially in cross-section, of a preloaded differential case assembly with ring gear, with bearings and with inboard shims, and illustrates, in a fragmentary cross-sectional view, the differential housing as spread so that the opening in the housing will accommodate the preloaded differential case assembly with bearings; and, FIG. 35 is a view showing the differential case without the ring gear and with two bearing assemblies, without shims on the differential case, to illustrate the variable dimension in the width of the bearing assemblies of the differential case assembly.

In FIG. 34 there is illustrated a preloaded differential case assembly 180 having bearing assembly 174 on the hub 178 and the bearing assembly 175 on the hub 176.

As recalled A represents the normal opening in the differential housing 150. "A + $\Delta$ A" represents the normal opening plus the spread of the opening in the housing, approximately 0.020 inches, so as to accommodate the preloaded differential case assembly.

The dimension C is the off-gear side dimension between the bearing assembly 174 and the differential case 180. The dimension X is thickness of the shims for the preloaded condition and is normally in the range of 0.008 inches to 0.010 inches. The dimension "C + X" is the preloaded dimension between the bearing assembly 174 and the differential case 180.

The dimension D is the gear side dimension between the bearing assembly 175 and the differential case 180. The dimension Y is the thickness of shims or the dimension for the preloaded condition, and is normally in the range of 0.008 inches to 0.010 inches.

The dimension "D + Y" is the preloaded dimension for the gear side dimension between the bearing assembly 175 and the differential case 180.

As is recalled the dimension X is equal to the dimension Y so that the thickness of the preload shims is the same on each side of the differential case 180.

The dimension B is the overall length of the differential case assembly with inboard shims and the bearing assemblies 174 and 175 positioned on the hubs 178 and 176 but in a non-preloaded condition.

The dimension "B + X + Y" is the preloaded overall length of the differential case assembly with inboard shims and the bearing assemblies 174 and 175 positioned on the hubs 176 and 178.

Figure 35:
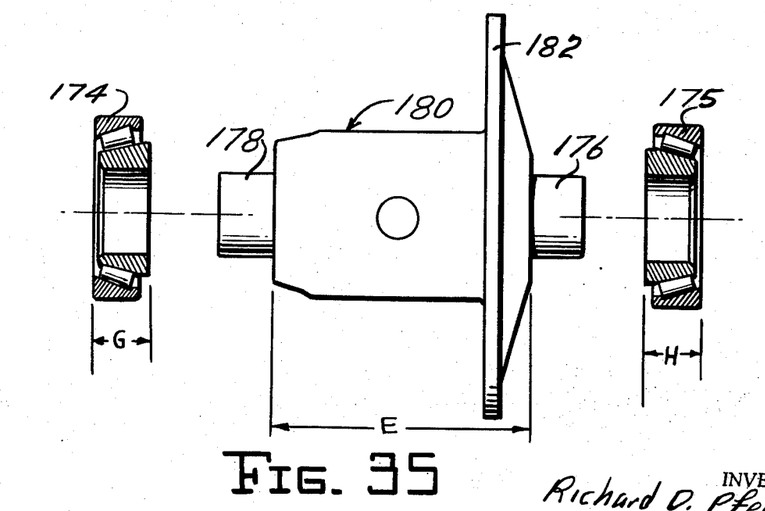

As explained in a preceding paragraph it is necessary to determine the thickness of the bearing assembly with respect to the thickness of the jig measuring blocks 190. In the manufacture of the bearing assemblies 174 and 175 the thickness of the bearing assemblies varies. The thickness of the jig measuring block, in this instance jig measuring block 190, is an approximate average of the thickness of bearing assemblies and is known. For example, a number of bearing assemblies may be measured for thickness and the average thickness of the bearing assemblies determined. Then, the jig measuring blocks are made the thickness equal to the average thickness of the bearing assemblies. It is because of this variation in the thickness of the bearing assemblies that it is necessary to adjust the thickness of shims, so as to compensate for this variation in the thickness of the bearing assemblies. This variation in the thickness of the bearing assemblies may be as much as ±0.003 inches. In this regard see FIG. 35 and bearing assemblies G and H. In almost all instances the thickness of the bearing assembly G will be different from the thickness of the bearing assembly H. It is because of the variation in the thickness of the bearing assemblies and other manufacturing tolerances for the ring gear and the pinion gear, the differential housing and the differential case, that my jig measuring blocks and method for using said jig measuring blocks have a value. To repeat, with the prior methods of overhauling a differential using inboard shims, as well as outboard shims, the bearing assemblies were pressed onto the hubs 176 and 178 on the differential case 180. The steps of determining the free basic dimension, the specified backlash and the correct gear tooth contact pattern necessitated the forceful removal or pulling off of the bearing assemblies 174 and 175 from the hubs 176 and 178. With the forceful pulling off of the bearing assemblies 174 and 175 the shims were destroyed and could not be used again. Once in a while the bearing assemblies 174 and 175 were so badly damaged or destroyed that the bearing assemblies had to be discarded. Then, it was necessary to use another bearing assembly. As thickness of bearing assemblies varies this necessitated once again the determination of the free basic dimension and the correct gear tooth contact pattern between the ring gear and the pinion gear. From this, you can see that shims were destroyed and bearing assemblies, possibly, damaged. As contrasted with this my jig measuring blocks and methods for using the same make it possible to slide or position the jig measuring blocks on the hubs 176 and 178 by hand and without the use of a tool to force the jig measuring blocks onto the hubs. Likewise, the jig measuring blocks can be removed by hand and without a tool, from the hubs 176 and 178. In addition, the shims are not damaged or destroyed by using this method. Further, my method and jig measuring blocks make it possible to more quickly remove the jig measuring blocks from the hubs as mechanical means are not required.

Figure 18:
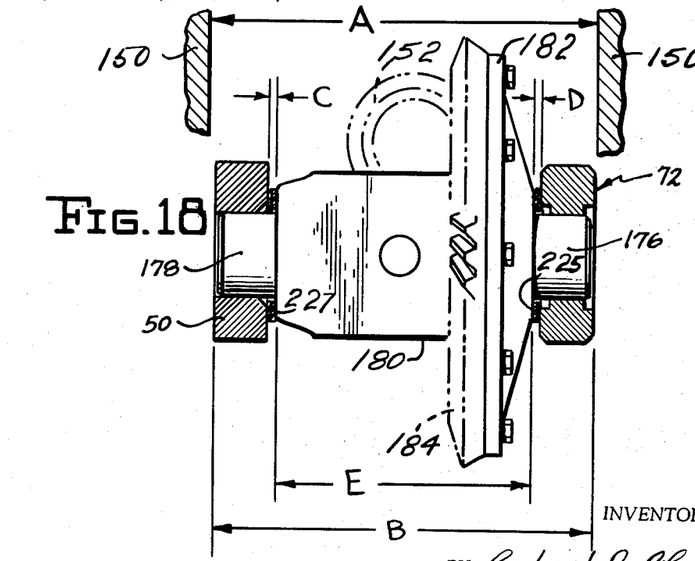
FIG. 18 is a fragmentary view illustrating some of the basic dimensions with respect to the differential case assembly, the inboard shims and two embodiments of the jig measuring blocks on the differential case test assembly.
Figure 19:
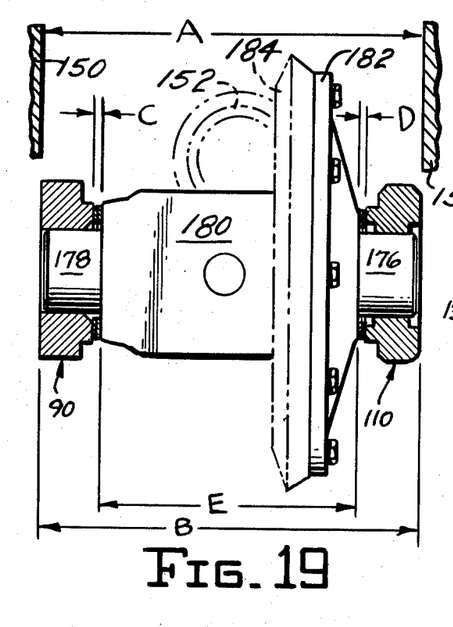
FIG. 19 is a fragmentary, partial cross-sectional view, illustrating the differential case test assembly, embodiments of the different jig measuring blocks and some of the basic dimensions involved in the differential case test assembly and the differential housing.
Figure 20:
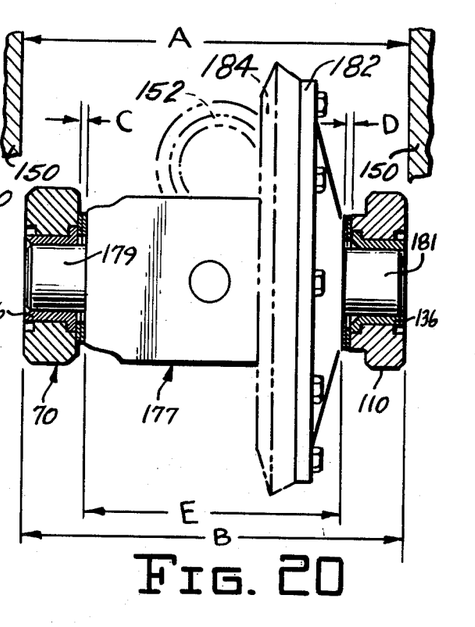
FIG. 20 is a fragmentary, partial cross-sectional view illustrating the differential case test assembly, different embodiments of the jig measuring blocks and some of the basic dimensions involved in the differential case test assembly and differential housing.

FIGS. 18, 19 and 20 illustrate the use of different jig measuring blocks on the differential case 180 and FIG. 20, in addition, illustrates the use of the adapter sleeve 136 in two different jig measuring blocks 70 and 110.

In FIG. 18 there is illustrated the jig measuring block 72 on the hub 176 and the jig measuring block 50 on the hub 178.

In FIG. 19 there is illustrated the jig measuring block 90 on the hub 178 and the jig measuring block 110 on the hub 176.

In FIG. 20 there is illustrated a differential case 177 having a hub 179 on the off-gear side and a hub 181 on the gear side of the differential case 177. The hubs 179 and 181 are of a smaller diameter than the hubs 176 and 178 of the differential case 180. Therefore, there is used the adapter sleeve 136. There is positioned on the hub 179 the jig measuring block 70 and with an adapter sleeve 136 in the jig measuring block 70 and on the hub 179. There is positioned on the hub 181 a jig measuring block 110 and with an adapter sleeve 136 in the jig measuring block 110 and on the hub 181.

Figure 25:
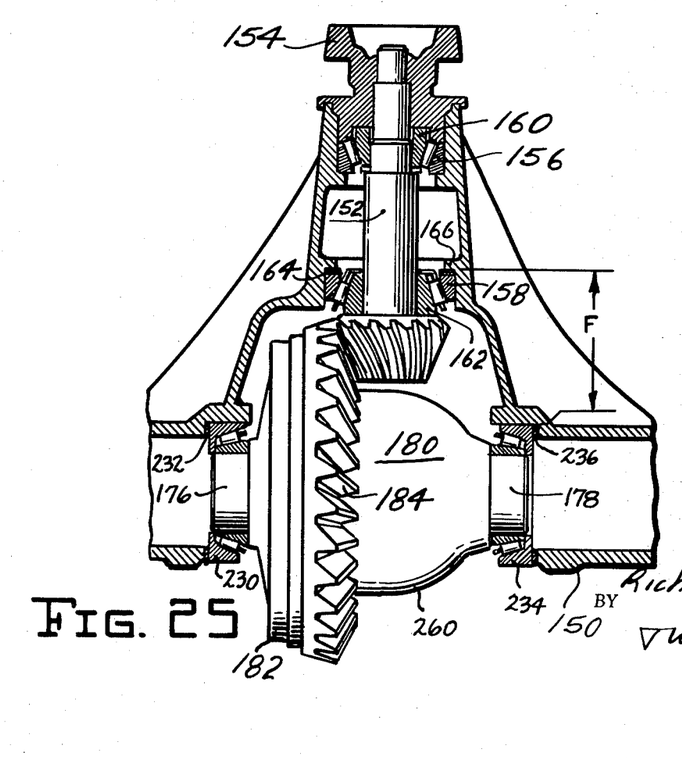
FIG. 25 is a fragmentary, partial cross-sectional view of the pinion gear assembly, the differential case assembly, and outboard shims in association with the differential case assembly, all in a differential housing.

FIGS. 25, 30, 31, 32 and 33 are directed to the outboard shim method for overhauling a differential. In FIG. 25 there is illustrated a differential case 180 having a bearing assembly 230 on the hub 176 and an outboard shim 232 associated with the bearing assembly 230 and the hub 176; and, having a bearing assembly 234 on the hub 178 and an outboard shim 236 associated with the bearing assembly 234 and the hub 178.

Figure 30:
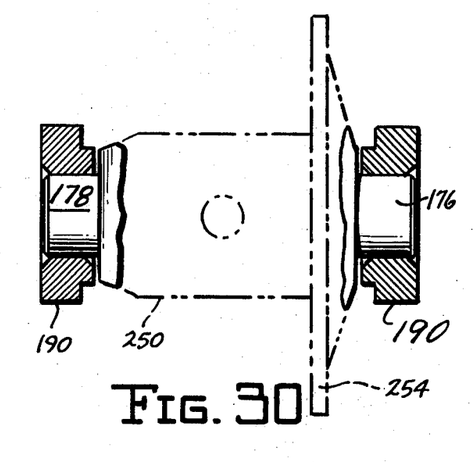
FIG. 30 is a view, partially in phantom and partially in cross-section, of a differential case test assembly without the ring gear, and with the jig measuring blocks on the differential case test assembly.

FIG. 30 is a differential case test assembly 250, without ring gear, and with jig measuring blocks 190 on the hubs 176 and 178, and without shims. This is to determine the free basic dimension.

Figure 31:
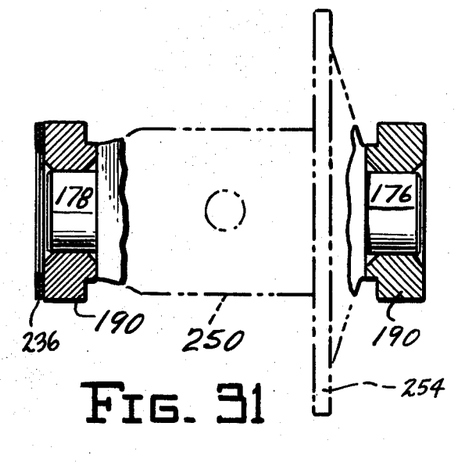
FIG. 31 is a view, partially in phantom and partially in cross-section, of the differential case test assembly without the ring gear, and with the jig measuring blocks on the differential case test assembly and with two outboard shims on the off-gear side of the differential case test assembly.

FIG. 31 is an illustration of the differential case test assembly 250, without ring gear, with the jig measuring block 190 on the hubs 176 and 178, and with two shims 236 associated with the jig measuring block 190 on the off-gear side of the differential case assembly. In FIG. 31, with the two shims 236 on the off-gear side of the differential case test assembly, there is being established the basic dimension of the differential case test assembly.

Figure 32:
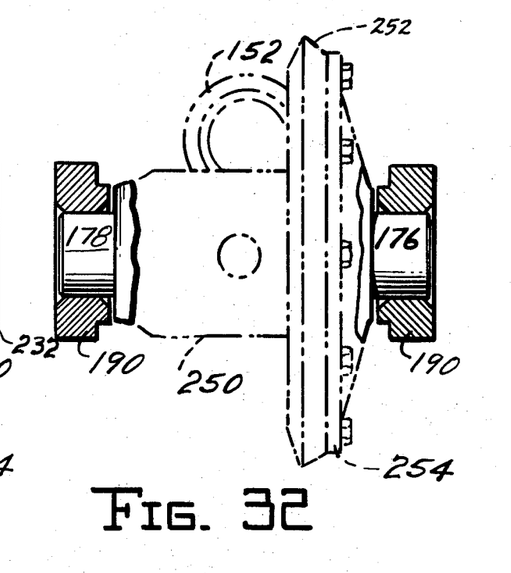
FIG. 32 is a view, partially in phantom and partially in cross section, of the differential case test assembly with the ring gear mounted on the ring gear mounting flange, and with the jig measuring blocks on the differential case test assembly.

In FIG. 32 there is illustrated a differential case test assembly 250 with the ring gear 252 on the ring gear mounting flange 254. As is seen in FIG. 32 there are no shims on the differential case test assembly. In FIG. 32 there is being established the correct backlash between the ring gear 252 and the pinion gear 152.

Figure 33:
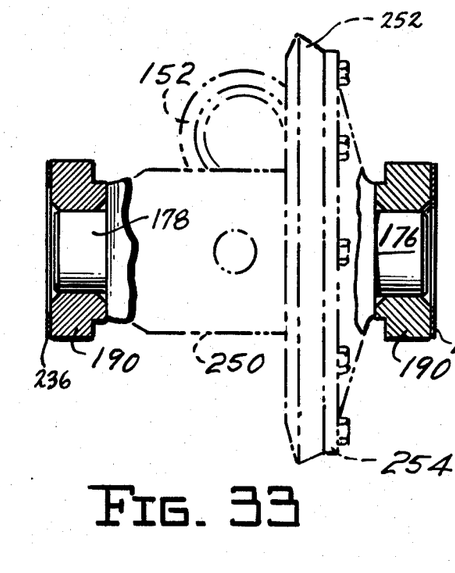
FIG. 33 is a view, partially in phantom and partially in cross-section, of a differential case test assembly with the ring gear mounted on the ring gear mounting flange, and with the jig measuring blocks on the differential case test assembly and with an outboard shim on the gear side and with an outboard shim on the off-gear side of the differential case test assembly.

In FIG. 33 there is illustrated a shim 232 in association with the jig measuring block 190 on the hub 176 on the gear side, and there is illustrated a shim 236 associated with the jig measuring block 190 on the hub 178 on the off-gear side. In FIG. 33 there is illustrated the nonpreloaded condition of the differential case test assembly before preload and before final assembly.

In FIG. 25 there is illustrated the pre-loaded differential case assembly 260 in the differential 150. Again, in FIG. 25 it is pointed out that there is one outboard shim 232 in association with the bearing assembly 230 on the hub 176; and, there is one outboard shim 236 in association with the bearing assembly 234 on the hub 178. The outboard shims 232 and 236 are normally of different thicknesses because of the variation in the thickness of the bearing assemblies and other manufacturing tolerances for the ring gear and the pinion gear, the differential housing and the differential case.

In the outboard shim method of assembling a differential, and in a differential having outboard shims, there is used only one shim instead of a shim pack. For example, the thickness of shims in a differential having outboard shims varies as follows: the thickness of the shims varies from 0.060 inches to 0.095 inches in increments of 0.001 inches.

Having presented my invention what I claim is:

1. A differential jig block to position the parts of a differential in their normal operating position to assist in securing rapid and accurate measurements of said parts and wherein said differential jig measuring block does not measure any of said parts but provides a basic reference dimension, said block comprising:
   a. a generally annular configuration whose outside diametrical dimension is substantially the same as but slightly less than the interior diametrical dimension of a bearing assembly bore and in which bore said block will be positioned;
   b. said block having a center line and said center line being the center line of said outside diametrical dimension and said center line also substantially coinciding with the center line of said bearing assembly bore when said block is positioned in said bore;
   c. said block with its generally annular configuration having a central bore;
   d. said center line of said block being the center line of said central bore;
   e. said central bore having an interior diametrical dimension substantially the same as but slightly larger than the exterior diametrical dimension of the first bearing surface on which the block will be positioned so as to provide a rotatable clearance between said block and said first bearing surface;
   f. said block having a width approximately equal to the width of a bearing assembly for which said bearing assembly said block will be temporarily substituted in said bearing assembly bore and on said bearing surface; and,
   g. said width being said basic reference dimension.

2. A differential jig block according to claim 1 and comprising:
   a. said block being substantially flat on both sides; and,
   b. said central bore being chamfered at one side.

3. A differential jig block according to claim 1 and comprising:
   a. said block being substantially flat on both sides; and
   b. said central bore having a stepped recess at one side.

4. A differential jig block according to claim 1 and comprising:
   a. said block being substantially flat on both sides; and,
   b. said block being chamfered at the junction of said side and said outside diametrical dimension.

5. A differential jig block according to claim 4 and comprising:
   a. said central bore being chamfered at one side.

6. A differential jig block according to claim 4 and comprising:
   a. said central bore having a stepped recess at one side.

7. A differential jig block according to claim 1 and comprising:
   a. said block being substantially flat on one side and having a shoulder on the other side; and,
   b. said shoulder having an exterior diameter approximately equal to the exterior diameter of the bearing cone thrust shoulder of said bearing assembly and for which said bearing assembly said block is being temporarily substituted.

8. A differential jig block according to claim 1 and comprising:
   a. said block being substantially flat on one side and having a shoulder on the other side; and,
   b. said shoulder having an exterior diameter less than the exterior diameter of the bearing cone thrust shoulder of said bearing assembly so as to allow shims to be positioned on said bearing surface and with respect to said thrust shoulder and for which said bearing assembly said block is being temporarily substituted.

9. A differential jig block according to claim 8 and comprising:
   a. said central bore being chamfered at the shoulder side.

10. A differential jig block according to claim 8 and comprising:
    a. said central bore having a stepped recess at the shoulder side.

11. A differential jig block according to claim 8 and comprising:
    a. said block being chamfered at the junction of said side and said outside diametrical dimension.

12. A differential jig block according to claim 8 and comprising:
    a. said block being chamfered at the junctions of said sides and said outside diametrical dimensions.

13. A differential jig block according to claim 12 and comprising:
    a. said central bore being chamfered at both sides.

14. A differential jig block according to claim 12 and comprising:
    a. said central bore having a stepped recess at both sides.

15. A differential jig block according to claim 1 and comprising:
    a. an adapter sleeve of a generally annular configuration whose exterior diametrical dimension is slightly less than the interior diametrical dimension of said central bore of said block so that said adapter sleeve may be positioned in said central bore of said block;

b. said adapter sleeve having a central bore whose interior diametrical dimension is substantially the same as but slightly larger than the exterior diametrical dimension of a second bearing surface on which said block and said adapter sleeve will be positioned; and, c. with said adapter sleeve in said central bore of said block the center line of said adapter sleeve substantially coinciding with the center line of said block.

16. A differential jig block according to claim 1 and comprising:

a. an adapter sleeve of a generally annular configuration whose exterior diametrical dimension is slightly less than the interior diametrical dimension of said central bore of said block so that said adapter sleeve may be positioned in said central bore of said block and to provide a rotatable clearance between said block and said adapter sleeve;

b. said adapter sleeve having a central bore whose interior diametrical dimension is substantially the same as but slightly larger than the exterior diametrical dimension of a second bearing surface on which said block and said adapter sleeve will be positioned so as to provide a rotatable clearance between said adapter sleeve and said second bearing surface;

c. said adapter sleeve having a center line which is also the center line of the adapter sleeve's central bore; and, d. with said adapter sleeve in said central bore of said block the center line of said adapter sleeve substantially coinciding with the center line of said block.

17. A differential jig block according to claim 16 and comprising:

a. said central bore of said block having a stepped recess at one side;

b. said adapter sleeve having a circular shoulder at one end; and, c. said adapter sleeve being positioned in the central bore of said block with said circular shoulder in said stepped recess.

18. A differential jig block according to claim 7 and comprising:

a. said central bore having a stepped recess at the shoulder side;

b. an adapter sleeve of a generally annular configuration whose exterior diametrical dimension is slightly less than the interior diametrical dimension of said central bore of said block so that said adapter sleeve may be positioned in said central bore of said block;

c. said adapter sleeve having a central bore whose interior diametrical dimension is substantially the same as but slightly larger than the exterior diametrical dimension of a second bearing surface on which said block and said adapter sleeve will be position;

d. said adapter sleeve having a circular shoulder at one end; and, e. said adapter sleeve being positioned in the central bore of said block with said circular shoulder in said stepped recess.

19. A differential jig block according to claim 7 and comprising:

a. said central bore having a stepped recess at the shoulder side;

b. an adapter sleeve of a generally annular configuration whose exterior diametrical dimension is slightly less than the interior diametrical dimension of said central bore of said block so that said adapter sleeve may be positioned in said central bore of said block and to provide a rotatble clearance between said block and said adapter sleeve;

c. said adapter sleeve having a central bore whose interior diametrical dimension is substantially the same as but slightly larger than the exterior diametrical dimension of a second bearing surface on which said block and said adapter sleeve will be positioned so as to provide a rotatable clearance between said adapter sleeve and said second bearing surface;

d. said adapter sleeve having a center line which is also the center line of the adapter sleeve's central bore;

e. with said adapter sleeve in said central bore of said block the center line of said adapter sleeve substantially coinciding with the center line of said block;

f. said adapter sleeve having a circular shoulder at one end;

g. said adapter sleeve being positioned in the central bore of said block with said circular shoulder in said stepped recess; and, h. the central bore of said adapter sleeve at the shoulder end having a bearing radius relief chamfer.

20. An adapter sleeve comprising:

a. said adapter sleeve being of a generally annular configuration whose exterior diametrical dimension is slightly less than the interior diametrical dimension of a central bore of a differential jig block, said block positioning the parts of a differential in their normal operating position to assist in securing rapid and accurate measurements of said parts and wherein said differential jig block does not measure any of said parts but provides a basic reference dimension, and in which bore aid adapter sleeve is to be positioned;

b. said adapter sleeve having a central bore whose interior diametrical dimension is substantially the same as but slightly larger than the exterior diametrical dimension of a second bearing surface on which said block and said adapter sleeve will be positioned; and, c. with said adapter sleeve in said central bore of said block the center line of said adapter sleeve substantially coinciding with the center line of said block.

21. An adapter sleeve according to claim 20 and comprising:

a. said adapter sleeve having an exterior diametrical dimension slightly less than the interior diametrical dimension of said central bore of said block so that said adapter sleeve may be positioned in said central bore of said block so as to provide a rotatable clearance between said block and said adapter sleeve;

b. said adapter sleeve having a central bore whose interior diametrical dimension is substantially the same as but slightly larger than the exterior diametrical dimension of a second bearing surface on which said block and said adapter sleeve will be positioned so as to provide a rotatable clearance between said adapter sleeve and said second bearing surface;

c. said adapter sleeve having a center line which is also the center line of the adapter sleeve's central bore; and, d. with said adapter sleeve in said central bore of said block the center line of said adapter sleeve substantially coinciding with the center line of said block.

22. An adapter sleeve according to claim 20 and comprising:

a. said adapter sleeve having a circular shoulder at one end.

* * * * *